Patented Oct. 21, 1941

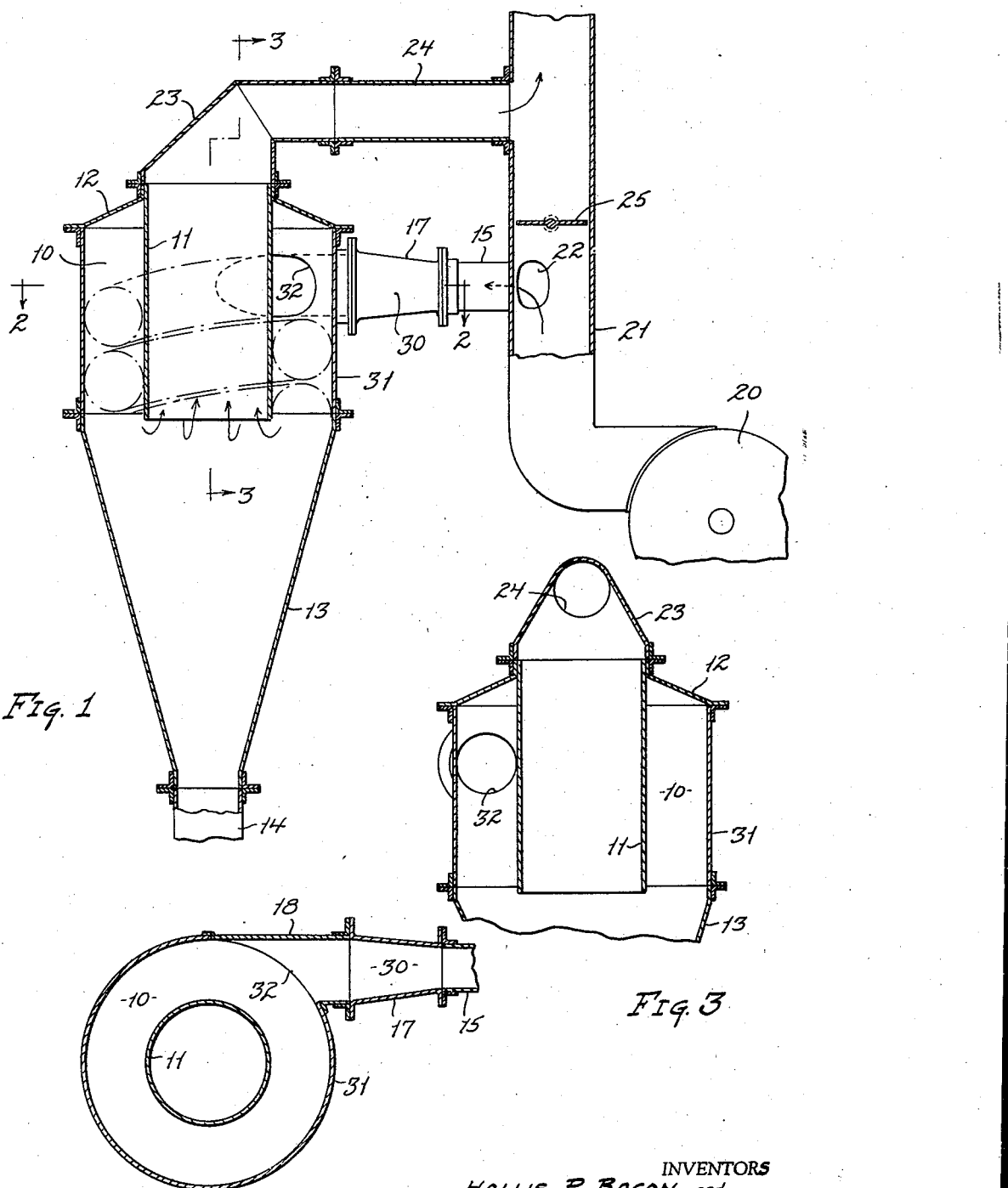

2,259,919

UNITED STATES PATENT OFFICE 2,259,919

DUST COLLECTOR

Hollis P. Bacon, Cleveland Heights, and Lawrence A. Eiben, Cleveland, Ohio, assignors to Northern Blower Company, Cleveland, Ohio, a corporation of Ohio Application January 23, 1939, Serial No. 252,272

1 Claim. (Cl. 183—83)

This invention relates to an improved dust collector, and especially to an improved dust collector of the cyclonic type. This, therefore, is the general object of the present invention.

Cyclonic dust collectors have heretofore been used with a cylindrical expansion chamber and a tubular baffle member extending axially thereof, with a frustro-conical dust collecting portion at the bottom of the cylindrical portion. Such collectors, however, have produced a relatively low operating efficiency; that is the ratio of dust removed to that supplied. For example, the average efficiency of removing sawdust has been about 70%; that for grinding dust has been between 62 and 65%, and that for removing limestone dust has been about 52%. Moreover, the cyclonic dust collectors heretofore used could not remove material measuring under 7½ microns to any appreciable extent. Such material therefore has been carried through the collector with the exhausted air and deposited on the ground surrounding the plant.

We have discovered that the relationship which exists between the sizes of the collector parts and the velocity of the air therein has a direct bearing on the efficiency of the operation, and that we can materially increase the efficiency beyond that hitherto obtainable in field work by control of the expansion in relation to velocity of the air.

An object of the present invention is to correlate the velocity of the incoming dust laden air to the size and arrangement of the conduits so as to increase materially the percentage of dust that can be removed in a collector of the cyclonic type heretofore set forth.

A further object is to make arrangements for increasing the operating efficiency without materially increasing the cost of construction of the collector.

Other objects and advantages of the present invention will become more apparent from the following description which refers to a preferred embodiment of the invention as illustrated in the accompanying drawing. The novel features of the invention will be summarized in the claim.

The foregoing objects are accomplished by utilizing an incoming air velocity materially higher than that customarily used and by passing the air through an expansion chamber before it enters the main chamber, and by maintaining a definite relationship between the velocities of the air at the intake point, at the end of the first expansion point, and in the central baffle which comprises the discharge conduit. Moreover, we maintain a definite relationship between the size of the conduit at the end of the first expansion and the radial distance between the main expansion member and the central baffle. The size of the baffle is determined from the amount of air to be handled and its desired velocity within the baffle. The specific relationship which we have found to produce satisfactory results will hereinafter be set forth in the following description.

In the drawing, Fig. 1 is a vertical axial section of my improved dust collector; Fig. 2 is a horizontal section of the dust collector as indicated by the lines 2—2 on Fig. 1; Fig. 3 is a vertical section of the dust collector as indicated by the line 3—3 on Fig. 1.

We have shown our invention in connection with a cyclonic dust collector which has a casing 31 which forms a cylindrical main expansion chamber 10, within which a tubular baffle 11 is concentrically disposed. The upper end of the expansion chamber 10 is closed by a plate 12 while the lower end opens into a frusto-conical dust collecting portion 13, the bottom of which terminates in a conduit 14 through which the dust is conveyed by a screw conveyor (not shown). The casing 31 is provided with a circular inlet opening 32, in other words an inlet opening which is defined by the intersection of a cylinder with the casing 31. The supply conduit for bringing the dust laden air to the collector is indicated as a cylindrical pipe 15 shown as leading from a stack 21 and connected to the chamber 10 by a frusto-conical connection 17, which forms an expansion chamber 30, and a cylindrical connection member 18.

The dust laden air is drawn from its source by a blower, generally indicated at 20, the outlet of which communicates with the stack 21 which is in communication as indicated at 22 with the inlet tube 15 of the dust collector. The air passes through the dust collector, rising upwardly through the tube 11 passing into a hood 23 which is secured to the top of the tube 11 and is of a gradual decreasing cross-sectional area. This hood is connected by an outlet tube 24 with the stack 21 at a point some distance above the connection 22 between the stack and the inlet tube 15. A suitable damper 25 is positioned in the stack 21 so that the dust laden air passing upwardly in the stack must pass through the dust collector before continuing its progress through the stack. The damper, however, may be turned to a vertical position so as to by-pass the dust collector when desired.

As heretofore mentioned, the arrangement is such that the dust laden air enters the expansion chamber 30 immediately before its entrance to the main expansion chamber 10 of the dust collector. As shown in the drawing, the inlet tube 15 is cylindrically shaped and is coaxial with the frusto-conical tube 17 which is arranged so that its cross-sectional area gradually increases as it approaches the dust collector 10. This frusto-conical tube provides the pre-expansion chamber

30 and permits the dust laden air to expand gradually as it approaches the main expansion chamber which includes that area between the inner surface of the casing 31 and the external surface of the tube 11. It is to be noted that the inlet tube 15, the pre-expansion chamber 30 or frusto-conical tube 17 and the connection 18 are so arranged that the passageway therethrough is tangential to the main expansion chamber 10.

The features above mentioned permit the dust laden air to enter the main expansion chamber at a much higher velocity than possible in the past, and when combined with the use of a high velocity of moving air, causes smaller and more dust particles to be removed from the dust laden air, thereby materially increasing the efficiency of the dust collector.

We have discovered that the efficiency of operation, as measured by the percentage of dust removed, is dependent upon the relationship between the velocity of the air at various points in its path of travel and the sizes of the collector parts. We have also discovered that for best results, a velocity of 3800-ft. per minute in the supply conduit 15 is desirable for carrying the maximum quantity of dust with the air. Such velocity is materially higher than that customarily used heretofore; the average previous velocity being of the order of 2200-ft. per minute in the supply conduit. For best results then, we have also found that the size of the pre-expansion chamber should be sufficient to reduce the velocity of the air to 3200-ft. per minute and that the velocity in the baffle or conduit 11 should be 700-ft. per minute. We have also discovered that the distance between the outer-surface of the baffle 11 and the inner surface of the chamber 10 should be substantially equal to the diameter of the intake conduit at the point where the velocity of the air is 3200-ft. per minute; or in other words, at the largest end of the expansion chamber 30. This arrangement causes the air to flow spirally within the main chamber without interference between the turns as indicated by the dot and dash lines in Fig. 1. This minimizes the internal friction and aids materially in the removal of dust. Additionally, the expansion in the chamber 30 before entering the chamber 10 eliminates the formation of eddy currents adjacent the inlet aperture and hence, eliminates a cause for friction within the chamber 10. An additional factor is the use of a circular conduit as a connection between the inlet pipe and the main expansion chamber.

To determine the pipe and chamber sizes for any predetermined dust removal operation, the volume of air to be handled at a velocity of 3800-ft. per minute determines the diameter of the pipe 15 and then the expansion necessary to reduce the velocity to 3200-feet per minute in the pipe 18 determines the diameter of the pipe 18. The space between the conduits 15 and 18 comprises a pre-expansion chamber which is preferably in the form of a frustro-conical section. Velocity in feet per minute as used herein refers to lineal speed, that is the lineal distance in feet the dust laden air would travel in one minute regardless of the volume of air involved.

The desired velocity of 700-ft. per minute in the tubular baffle 11 determines the diameter of it and from that diameter, the size of the main chamber 10 is determined by making the distance between the outer surface of the conduit 11 and the inner surface of the chamber 10 substantially equal to the diameter of the pipe 18. While we have stated that the preferred velocity of air is 3800-ft. per minute at the source of supply, we do not wish to be limited specifically to that amount, because it may vary with the specific gravity of material that is to be handled. We believe that the velocity may vary between 3000 and 5000 ft. per minute, the higher velocity being required for the heavy materials. In any event, the supply velocity should bear a relationship to that at the end of the first or pre-expansion chamber, and to that in the central tubular baffle in the proportion of 3800 to 3200 to 700-ft. per minute respectively. Thus, where the supply velocity is 5000 ft. per minute, the corresponding velocity at the end of the first-expansion would be approximately 4200-ft. per minute, and the corresponding velocity in the tubular baffle would be approximately 900-ft. per minute. Again, where the supply velocity is about 3000 ft. per minute, the corresponding velocity at the end of the first expansion would be approximately 2500-ft. per minute while that in the tubular baffle would be about 550-ft. per minute.

A comparative test using cement dust weighing 73-lbs. when loosely packed wherein 99% of the material would pass through a 325-mesh screen, and wherein 38% of the total material was under 7½ microns showed, under the old method of collection, substantially no collection of material under 7½ microns, and an average collection efficiency of 48%, whereas under our new method, the collection of material under 7½ microns was about 15% while the average efficiency was about 76%. This is an increase in efficiency of about 60%.

Other tests made on different materials likewise showed a material increase in efficiency between the old and new methods. For example, on sawdust the average efficiency under the old method was about 70%, but under the new method was about 96%. On grinding dust the efficiency under the old method was about 62 to 65% and under the new between 92 and 95%. On limestone the tests showed an average collection efficiency under the old method of about 52% and under the new method of about 89%.

We claim:

A cyclonic dust collector having a main cylindrical expansion chamber and a cylindrical baffle extending coaxially thereof and positioned therein and extending downwardly from the top of the main chamber, and having a funnel-shaped vortex chamber below the main expansion chamber, an air admission conduit connected to the main expansion chamber, said conduit having one side thereof extending tangentially to the exterior wall of the main expansion chamber, said air admission conduit having means for expanding the air in advance of its admission into the main expansion chamber, the first expansion means comprising a tapered member having a base, the horizontal cross-sectional dimension of which is substantially equal to the radial distance between the outer surface of the baffle and the inner surface of the main expansion chamber, and the bottom of the air admission conduit being spaced above the bottom of the baffle by an amount at least equal to the vertical cross-sectional dimension of the base of the air admission conduit.

HOLLIS P. BACON.
LAWRENCE A. EIBEN.